Jan. 25, 1955 L. G. GRIEBLING 2,700,366
APPARATUS FOR TREATING COATED FABRIC TO REMOVE
EXCESS COATING MATERIAL THEREFROM
Filed July 14, 1951 2 Sheets-Sheet 1

INVENTOR.
Louis G. Griebling
BY
ATTORNEYS

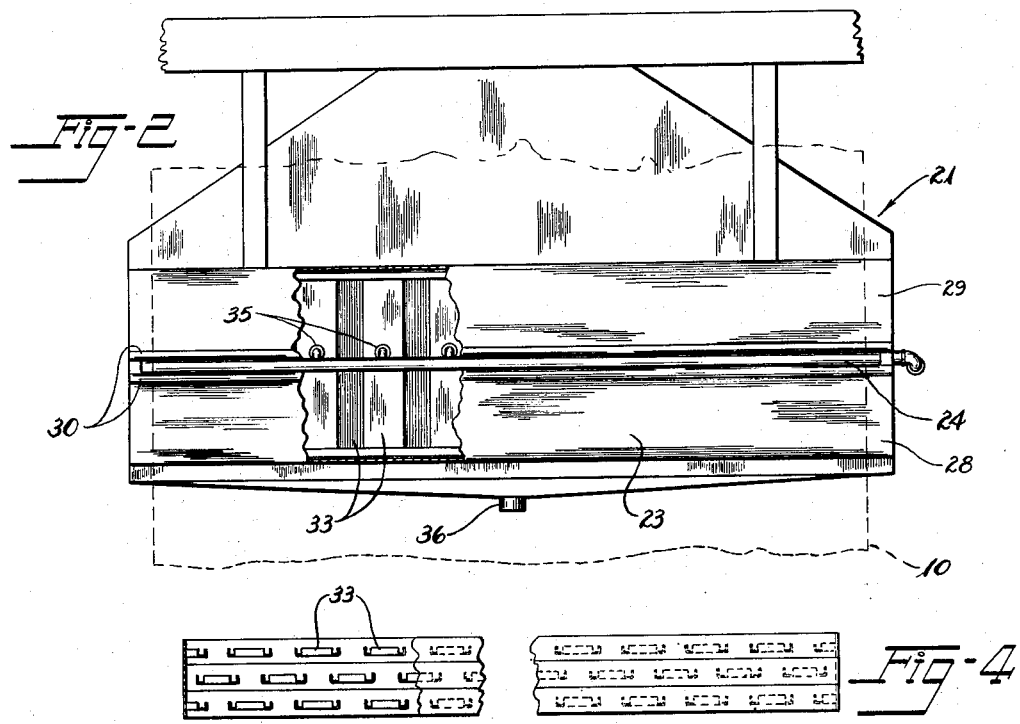
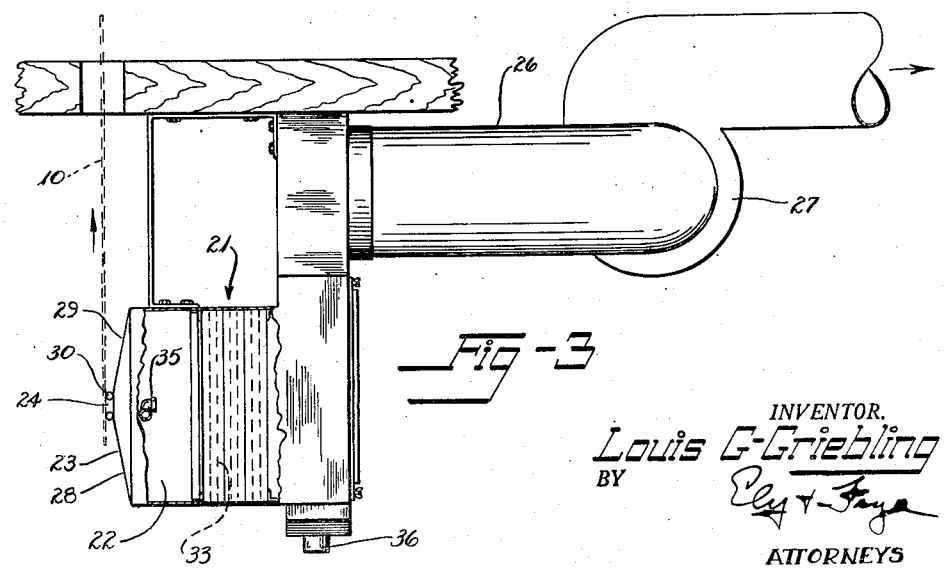

United States Patent Office 2,700,366
Patented Jan. 25, 1955

2,700,366

APPARATUS FOR TREATING COATED FABRIC TO REMOVE EXCESS COATING MATERIAL THEREFROM

Louis G. Griebling, Akron, Ohio, assignor to The Firestone Tire & Rubber Company, Akron, Ohio, a corporation of Ohio Application July 14, 1951, Serial No. 236,779

1 Claim. (Cl. 118—50)

This invention relates to the coating and drying of fabric and more particularly to a method of removing excess deposits of latex from latex dipped fabric which is used in the manufacture of tires.

Fabrics which are used in the manufactuer of tires are impregnated with a latex solution to prepare them for an application of a skim coating of rubber in subsequent operations. The fabric is passed into a dip tank containing a suitable latex dispersion, is passed upwardly from the tank through a pair of wringer rolls, and is then dried by passing it through a heated oven.

Various difficulties have been encountered in such a process of treating the fabric because the latex solution does not adhere uniformly to the cords but tends to produce so-called "gum streaks" which are irregular accumulations of excess latex. The excess latex causes the cords of the fabric to stick together, results in uneven cord spacing, and causes difficulty in the handling of the fabric due to the tendency of the excess latex material to foul the equipment. The non-uniformity of the dipped fabric is undesirable in the manufacture of tires and results in a non-uniform and sometimes inferior product. In addition, the drying equipment tends to become fouled and must be shut down at frequent intervals for cleaning.

These and other difficulties are overcome by the present invention which contemplates drawing large volumes of air through the fabric shortly after it has been withdrawn from the dip tank. The air moves at an appreciable velocity and tends to vibrate the fabric, and in this manner causes the strands to separate and to assume a uniform spacing. The vibrating strands of the fabric tend to throw off the excess amounts of the latex solution into the moving stream of air. "Gum streaks" are thus eliminated and a more uniform coating of latex is produced. Not only is a more uniform coated fabric produced, but there is an increased efficiency in the subsequent drying operation. Provision is also made to recover the excess latex solution from the air and to return it to the dip tank so that an added economy results.

A general object of the invention, therefore, is to provide means for producing a more uniform latex coating of tire fabric, with the elimination of excess latex accumulations known as "gum streaks."

Another object is to provide a more uniform cord spacing of latex dipped fabric, particularly eliminating adjacent cords sticking together.

Another object is to provide an improved and more economical latex dipping operation.

Another object is to provide increased effectiveness of the drying apparatus as well as reduced cleaning and maintenance costs.

Further objects and advantages will be more apparent from the following description of the invention, reference being had to the accompanying drawings in which:

Figure 2 is a front elevation of a preferred form of apparatus embodying the invention;

Figure 3 is a side elevation, partly in section, of the apparatus of Figure 2; and Figure 4 is a fragmentary section showing the disposition of the baffles within the apparatus.

Figure 1:
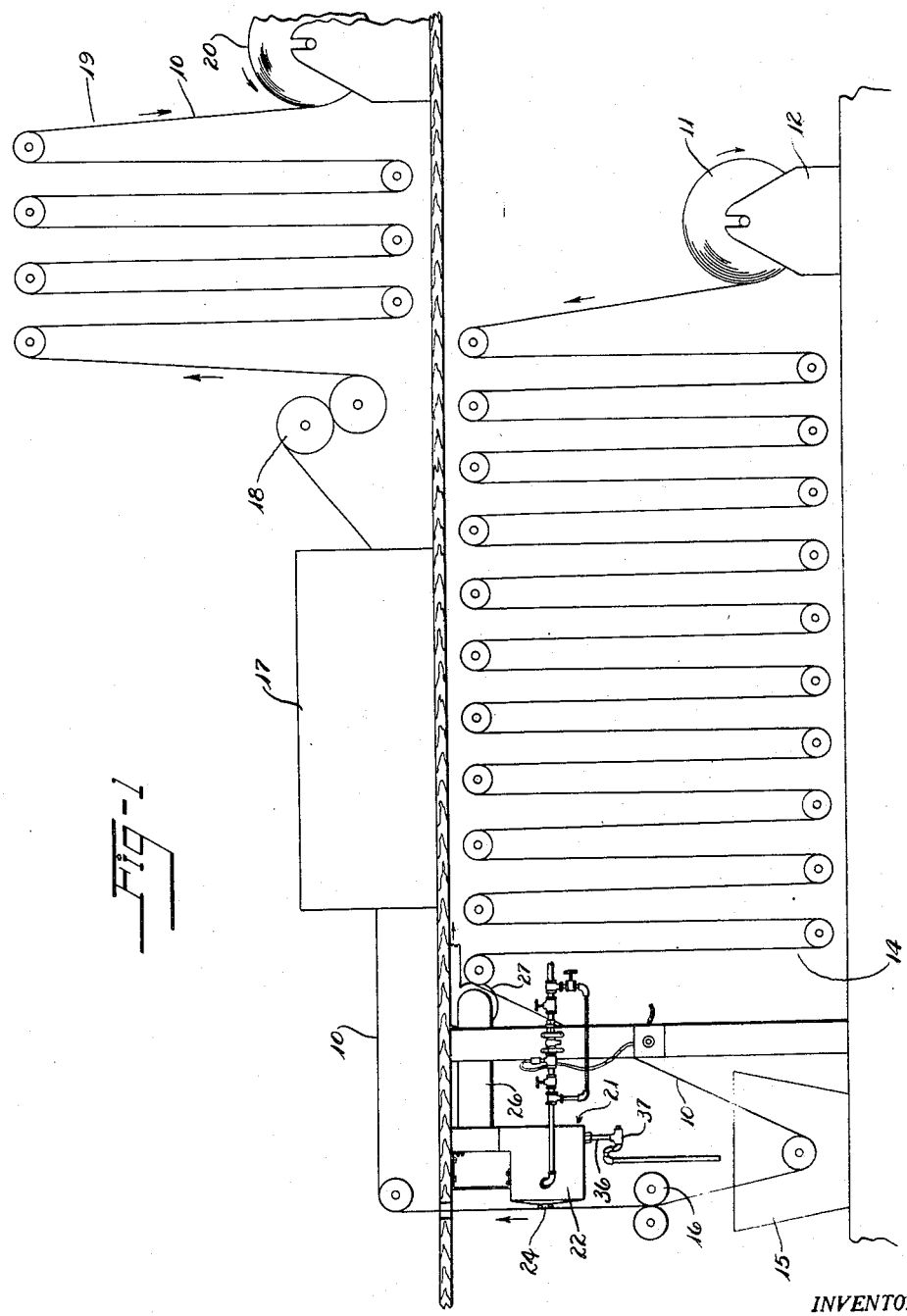
Figure 1 is a diagrammatic view of the invention shown in relation to otherwise conventional dipping and drying apparatus.

As indicated in Figure 1, the tire fabric is impregnated with a solution of latex and then dried in the following manner: The fabric 10 is pulled from a roll 11 which is supported by a roll stand 12 positioned adjacent the dip tank 15. The fabric is led through festooning rolls indicated generally at 14 and passed downwardly into the dip tank 15 containing the aqueous latex dispersion. From the tank it is withdrawn upwardly through a pair of squeeze or wringer rolls 16 from which it moves upwardly into a drying oven 17. From the drying oven it passes downwardly through a pair of rolls 18 and thence through suitable festooning apparatus 19 to a take-up roll 20. Tension is imparted to the fabric by the rolls 18 sufficient to pull the fabric through the whole dipping and drying apparatus. No other drive is imparted to the fabric. Most of the excess gum latex solution is removed from the fabric by the wringer rolls 16, but these are not effective in removing irregular accumulations of latex in the strands which cause uneven cord spacing and which cause adjacent cords to stick together. Heretofore, there was no means of removing these "gum streaks," for the fabric was passed directly without further treatment to the drying oven.

In the present invention latex-eliminating apparatus indicated generally at 21 is positioned adjacent the fabric immediately after it leaves the wringer rolls. As best shown in Figure 2, the apparatus comprises a vacuum chamber 22 of sheet metal construction having a front wall 23 positioned adjacent the fabric and having a narrow slot or opening 24 extending across the width of the fabric so that the air, as it is drawn into the vacuum chamber, passes through the fabric at a considerable velocity. The air then passes through the latex recovering part of the apparatus and passes upwardly from the chamber to the exhaust duct 26 where it is discharged from the building. The suction fan or blower 27 which creates the vacuum is conveniently located in the exhaust duct and in the present illustration has a capacity of at least 2,500 cubic feet of air per minute. It is desirable that the slotted opening 24 of the vacuum chamber have a width which matches rather closely the width of the fabric, i. e., about 5–6 feet, so that leakage of air into the chamber around the fabric is held to a minimum. It is also desirable that the size of the opening, i. e., the height of the opening, be adjusted to the capacity of the blower so that the air passing through the fabric will have a velocity in the order of 5–10,000 ft. a minute. It has been observed that the higher velocities of air are more effective in removing the excess latex solution. In the present example, an opening of one inch has proven satisfactory.

Preferably the front wall 23 tapers to the slot as shown at 28 and 29 to minimize any abrasive contact between the fabric and the chamber. The edges of the slot are defined by rounded beads 30 so that the fabric will move freely past the slot without catching or tearing on the edges.

In operation, the air in moving through the fabric causes the cords to vibrate in much the same manner as the strings or reeds of musical instruments vibrate in response to air moving over them. The result is that the vibrating cords of the fabric tend to throw off any excess latex solution which clings to them. Sufficient vibrational energy is imparted to the cords to enable adjacent cords which may adhere together to rid themselves of the excess solution binding them together and to assume more uniform spacing. The result is that local concentrations of excess latex solution are removed and that cords of the fabric tend to become more uniformly spaced. Substantial amounts of latex solution are removed in this step so that more efficient and economical operation of the subsequent drying operation is possible. The excess latex solution which is removed from the fabric is immediately entrained in the air and carried into the vacuum chamber.

After the air picks up the excess latex, it passes through a system of baffles 33 which causes the air to lose velocity and to deposit on the baffles any entrained latex solution. The baffles are in the form of a series of parallel plates of considerable area arranged in alternating and staggered arrangement as shown in Figures 2 and 4. The plates are supported by and are secured to the walls of the chamber in any suitable manner. The latex solution which is deposited on the baffle plates is removed at intervals by water sprays which issue intermittently from a plurality of nozzles 35, the sprays being turned on and off by an automatic timing apparatus of conventional construction. This regular washing of the eliminator baffle plates prevents the excess latex solution from drying on the plates and enables it to be returned to the dip tank through a conduit 36. The conduit may be provided with a trap 37 to remove any solids from the recovered solution.

While the preferred form of my invention takes the form of a vacuum chamber, it will be apparent that certain of the advantages of the invention may be obtained by a blast of air directed against fabric with or without exhaust means for recovering the excess solution. Various modifications and changes in the invention will be apparent to those skilled in the art without departing from the spirit and scope of the invention, the essential features of which are described in the appended claim.

What is claimed is:

Apparatus for treating fabric after the same has been dipped in an aqueous suspension of latex comprising means to withdraw said fabric from said tank to provide a length of moving fabric, a vacuum chamber having an intake nozzle positioned intermediate the length of said fabric and adjacent thereto and adapted to draw air continuously through said fabric in a plane transverse the path of travel of said fabric at an appreciable velocity, whereby the movement of air through said stream vibrates the strands of said fabric to shake surplus latex from said strands and entrains said surplus latex in said moving air, and means to recover said latex from said air.

References Cited in the file of this patent

UNITED STATES PATENTS

| Number | Name | Date |
|---|---|---|
| 1,328,541 | Palmer | Jan. 20, 1920 |
| 2,333,629 | Beadle | Nov. 9, 1943 |
| 2,389,459 | Remark | Nov. 20, 1945 |
| 2,450,847 | Wilson | Oct. 5, 1948 |
| 2,460,390 | McDermott | Feb. 1, 1949 |